United States Patent
Hooli et al.

(10) Patent No.: US 10,785,011 B2
(45) Date of Patent: Sep. 22, 2020

(54) METHOD AND APPARATUS FOR IMPLEMENTING CONTROL AND REFERENCE SIGNALS FOR PHYSICAL-UPLINK-SHARED-CHANNEL COMMUNICATION

(71) Applicant: NOKIA TECHNOLOGIES OY, Espoo (FI)

(72) Inventors: Kari Hooli, Oulu (FI); Esa Tiirola, Kempele (FI); Timo Lunttila, Espoo (FI); Juha Korhonen, Espoo (FI); Esa Malkamäki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 106 days.

(21) Appl. No.: 16/070,796

(22) PCT Filed: Jan. 17, 2017

(86) PCT No.: PCT/FI2017/050017
§ 371 (c)(1),
(2) Date: Jul. 18, 2018

(87) PCT Pub. No.: WO2017/134337
PCT Pub. Date: Aug. 10, 2017

(65) Prior Publication Data
US 2019/0020459 A1     Jan. 17, 2019

Related U.S. Application Data

(60) Provisional application No. 62/291,289, filed on Feb. 4, 2016.

(51) Int. Cl.
*H04L 5/00* (2006.01)
*H04L 1/18* (2006.01)

(52) U.S. Cl.
CPC .......... *H04L 5/0091* (2013.01); *H04L 1/1812* (2013.01); *H04L 1/1887* (2013.01);
(Continued)

(58) Field of Classification Search
CPC ........................... H04L 1/1812; H04L 5/0091
See application file for complete search history.

(56) References Cited

U.S. PATENT DOCUMENTS

| | | | |
|---|---|---|---|
| 2011/0075629 A1* | 3/2011 | Seo ..................... | H04W 74/002 370/330 |
| 2014/0071954 A1* | 3/2014 | Au ..................... | H04W 72/0446 370/336 |
| 2017/0374679 A1* | 12/2017 | Park ......................... | H04L 5/00 |

FOREIGN PATENT DOCUMENTS

EP     3372034 A1     9/2018

OTHER PUBLICATIONS

Apr. 23, 2019 Office Action issued in Japanese Patent Application No. 2018-533249.
(Continued)

*Primary Examiner* — Zhensheng Zhang
(74) *Attorney, Agent, or Firm* — Squire Patton Boggs (US) LLP (57) ABSTRACT

A method and apparatus may include receiving a first signal. The first signal includes first configuration information, second configuration information, and third configuration information. The method may also include detecting a second signal based on the first configuration information. The method may also include transmitting a third signal based on the second configuration information. The method may also include transmitting a fourth signal based on the third configuration information and the detected second signal.

20 Claims, 7 Drawing Sheets

(52) U.S. Cl.
CPC .......... *H04L 5/0053* (2013.01); *H04L 5/0007* (2013.01); *H04L 5/0051* (2013.01)

(56) References Cited

OTHER PUBLICATIONS

Alcatel-Lucent Shanghai Bell, Overview of Specification Impact for TTI Shortening[online], 3GPP TSG-RAN WG1#83 R1-156721, internet<URL:http://www.3gpp.org/ftp/tsg_ran/WG1_RL1/TSGR1_83/Docs/R1-156721.zip>, Nov. 7, 2015, pp. 1-3.

Aug. 21, 2019 Extended Search Report issued in European Patent Application No. 17747050.7.

International Search Report & Written Opinion dated Mar. 17, 2017 corresponding to International Patent Application No. PCT/FI2017/050017.

M. Tano et al., "Layered OFDMA Radio Access for IMT-Advanced," IEEE Vehicular Technology Conference, Sep. 21-25, 2008, pp. 1-6.

Nokia Networks "On required physical layer enhancements for TTI shortening," R1-157294, 3GPP TSG-RAN WG1 Meeting #83, Anaheim, USA, Nov. 15-22, 2015.

Ericsson, "Physical layer aspects of short TTI for uplink transmissions," R1-157149, 3GPP TSG RAN WG1 Meeting #83, Anaheim, USA, Nov. 15-22, 2015.

Ericsson, "Physical layer aspects of TTI shortening for downlink transmissions," R1-157148, 3GPP TSG RAN WG1 Meeting #83, Anaheim, USA, Nov. 15-22, 2015.

ETSI TS 136.213 V12.7.0 (Oct. 2015), ETSI, Technical Specification, LTE; Evolved Universal Terrestrial Radio Access E-UTRA); Physical layer procedures (3GPP TS 36.213 version 12.7.0 Release 12), Oct. 2015.

Communication pursuant to Article 94(3) EPC issued in corresponding European Patent Application No. 17 747 050.7, dated Mar. 23, 2020.

* cited by examiner

METHOD AND APPARATUS FOR IMPLEMENTING CONTROL AND REFERENCE SIGNALS FOR PHYSICAL-UPLINK-SHARED-CHANNEL COMMUNICATION

RELATED APPLICATION

This application was originally filed as PCT Application No. PCT/FI2017/050017 on Jan. 17, 2017, which claims priority from U.S. Provisional Patent Application No. 62/291,289 filed Feb. 4, 2016.

BACKGROUND

Field

Certain embodiments of the present invention relate to implementing control and reference signals for physical-uplink-shared-channel communication.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include receiving, by a user equipment, a first signal. The first signal comprises first configuration information, second configuration information, and third configuration information. The method may also include detecting a second signal based on the first configuration information. The method may also include transmitting a third signal based on the second configuration information. The method may also include transmitting a fourth signal based on the third configuration information and the detected second signal.

In the method of the first embodiment, the first signal may include a first part of downlink control information, the second signal comprises a second part of downlink control information, the third signal comprises a demodulation reference signal, and the fourth signal comprises short Transmission-Time-Interval Physical Uplink Shared Channel communication.

In the method of the first embodiment, the first signal determines a search space for the user equipment to detect the second signal.

In the method of the first embodiment, the second signal indicates that the user equipment is allowed to transmit the fourth signal according to the first and the second part of downlink control information.

In the method of the first embodiment, the second signal comprises at least a Hybrid Automatic Repeat Request process number.

In the method of the first embodiment, the first signal is received on Physical Downlink Control Channel or Enhanced PDCCH, and the second signal is detected on a control channel associated with shortened Transmission Time Interval, and the first signal has a larger payload than the second signal.

According to a second embodiment, an apparatus may include at least one processor. The apparatus may also include at least one memory including computer program code. The at least one memory and the computer program code may be configured, with the at least one processor, to cause the apparatus at least to receive a first signal. The first signal comprises first configuration information, second configuration information, and third configuration information. The apparatus may also be caused to detect a second signal based on the first configuration information. The apparatus may also be caused to transmit a third signal based on the second configuration information. The apparatus may also be caused to transmit a fourth signal based on the third configuration information and the detected second signal.

In the apparatus of the second embodiment, the first signal comprises a first part of downlink control information, the second signal comprises a second part of downlink control information, the third signal comprises a demodulation reference signal, and the fourth signal comprises short Transmission-Time-Interval Physical Uplink Shared Channel communication.

In the apparatus of the second embodiment, the first signal determines a search space for the apparatus to detect the second signal.

In the apparatus of the second embodiment, the second signal indicates that the apparatus is allowed to transmit the fourth signal according to the first and the second part of downlink control information.

In the apparatus of the second embodiment, the second signal comprises at least a Hybrid Automatic Repeat Request process number.

In the apparatus of the second embodiment, the first signal is received on Physical Downlink Control Channel or Enhanced PDCCH, and the second signal is detected on a control channel associated with shortened Transmission Time Interval, and the first signal has a larger payload than the second signal.

According to a third embodiment, a computer program product may be embodied on a non-transitory computer readable medium. The computer program product configured to control a processor to perform a method according to the first embodiment.

According to a fourth embodiment, a method may include transmitting, by an enhanced Node B, a first signal to a user equipment. The first signal comprises first configuration information, second configuration information, and third configuration information. The method may also include transmitting a second signal to the user equipment in accordance to the first configuration information. The method may also include receiving a third signal from the user equipment. The third signal is transmitted by the user equipment based on the second configuration information. The method may also include receiving a fourth signal from the user equipment. The fourth signal is transmitted by the user equipment based on the third configuration information and the detected second signal.

In the method of the fourth embodiment, the first signal comprises a first part of downlink control information, the second signal comprises a second part of downlink control information, the third signal comprises a demodulation reference signal, and the fourth signal comprises short Transmission-Time-Interval Physical Uplink Shared Channel communication.

In the method of the fourth embodiment, the second signal is transmitted to the user equipment on a search space determined by the first signal.

In the method of the fourth embodiment, the second signal indicates that the user equipment is allowed to transmit the fourth signal according to the first and the second part of downlink control information.

In the method of the fourth embodiment, the second signal comprises at least a Hybrid Automatic Repeat Request process number.

In the method of the fourth embodiment, the first signal is transmitted on Physical Downlink Control Channel or Enhanced PDCCH, the second signal is transmitted on a control channel associated with shortened Transmission Time Interval, and the first signal has a larger payload than the second signal.

According to a fifth embodiment, an apparatus may include at least one processor. The apparatus may also include at least one memory including computer program code. The at least one memory and the computer program code may be configured, with the at least one processor, to cause the apparatus at least to transmit a first signal to a user equipment. The first signal comprises first configuration information, second configuration information, and third configuration information. The apparatus may also be caused to transmit a second signal to the user equipment in accordance to the first configuration information. The apparatus may also be caused to receive a third signal from the user equipment. The third signal is transmitted by the user equipment based on the second configuration information. The apparatus may also be caused to receive a fourth signal from the user equipment. The fourth signal is transmitted by the user equipment based on the third configuration information and the detected second signal.

In the apparatus of the fifth embodiment, the first signal comprises a first part of downlink control information, the second signal comprises a second part of downlink control information, the third signal comprises a demodulation reference signal, and the fourth signal comprises short Transmission-Time-Interval Physical Uplink Shared Channel communication.

In the apparatus of the fifth embodiment, the second signal is transmitted to the user equipment on a search space determined by the first signal.

In the apparatus of the fifth embodiment, the second signal indicates that the user equipment is allowed to transmit the fourth signal according to the first and the second part of downlink control information.

In the apparatus of the fifth embodiment, the second signal comprises at least a Hybrid Automatic Repeat Request process number.

In the apparatus of the fifth embodiment, the first signal is transmitted on Physical Downlink Control Channel or Enhanced PDCCH, the second signal is transmitted on a control channel associated with shortened Transmission Time Interval, and the first signal has a larger payload than the second signal.

According to a sixth embodiment, a computer program product may be embodied on a non-transitory computer readable medium. The computer program product may be configured to control a processor to perform a method according to the fourth embodiment.

BRIEF DESCRIPTION OF THE DRAWINGS

For proper understanding of the invention, reference should be made to the accompanying drawings, wherein.

DETAILED DESCRIPTION

Certain embodiments of the present invention relate to implementing control and reference signals for physical-uplink-shared-channel communication. Certain embodiments may be utilized in conjunction with a Long Term Evolution-Advanced (LTE-A) system, which may be a part of 3GPP LTE Release 13/14. More specifically, certain embodiments may reduce latency for uplink data transmitted on the Physical Uplink Shared Channel (PUSCH). Certain embodiments may be related to the subject matter described in Release 13 Study Item "Study on Latency Reduction Techniques." Further, a related Release 13 Study Item was approved at Technical Specification Group (TSG) RAN#67, on March 2015. The most relevant parts of the study item are copied in the text below:

The objective of this study item is:
Study enhancements to the E-UTRAN radio system in order to:
Significantly reduce the packet data latency over the LTE Uu air interface for an active UE
Significantly reduce the packet data transport round trip latency for UEs that have been inactive for a longer period (in connected state).
The study area includes resource efficiency, including air interface capacity, battery lifetime, control channel resources, specification impact and technical feasibility. Both FDD and TDD duplex modes are considered.
From RAN1#83: TTI shortening and reduced processing times [RAN1]:
Assess specification impact and study feasibility and performance of TTI lengths between 0.5 ms and one OFDM symbol, taking into account impact on reference signals and physical layer control signaling
backwards compatibility shall be preserved (thus allowing normal operation of pre-Rel 13 UEs on the same carrier);

Certain embodiments of the present invention may be directed to an arrangement of downlink (DL) control signals and uplink (UL) reference signals, for short Time Transmission Interval (TTI) Physical Uplink Shared Channel (PUSCH), in order to facilitate a reduction in latency. Short TTI may be seen as a TTI shorter than the TTI that is used when UE performs initial access to the network. In case of LTE Release 13, short TTI means TTIs shorter than 1 ms.

Communication on LTE PUSCH may require downlink (DL) control signalling. The downlink control signalling provides user equipment (UE) with a grant to transmit, along with providing the necessary parameters for configuring/determining the transmission. With regard to UL reference signals, communication on LTE PUSCH may require an uplink (UL) Demodulation Reference Signal (DMRS) for channel estimation and coherent demodulation at a corresponding enhanced Node B (eNB).

With a shorter TTI, both DL control signalling and UL DMRS may need to be transmitted at higher rate. For example, the DL control signalling and the UL DMRS may need to be transmitted more frequently. Because preserving backwards compatibility may be important, the symbol durations of the transmissions may not be permitted to be shortened. Supporting DL control signalling and UL DMRS, for short TTI PUSCH, may introduce complications and inefficiencies.

It may be desirable to maintain the single-carrier frequency-division-multiple-access (SC-FDMA) property of the communications, as well as maintain the current DMRS sequence design, for short TTI PUSCH. However, maintaining the SC-FDMA property and maintaining the current DMRS sequence design may mean that DMRS would fully occupy SC-FDMA symbols, which may result in increased DMRS overhead. For example, transmitting DMRS would result in 50% overhead, if DMRS is transmitted in each 2-symbol TTI.

Technical Document R1-157148 and R1-157149 have proposed that transmitting downlink control information (DCI) could be divided into two parts. One part of DCI transmitting may be a slow transmission of DCI where, for example, a first part of DCI is transmitted once per subframe. Another part of DCI transmitting may be a fast transmission of a second part of DCI where, for example, DCI is transmitted for every shortened TTI. This approach may reduce the amount of information that is contained in fast DCI. Hence, this approach may mitigate the impact of an increased overhead that results from more frequent transmission of DCI.

However, the contents of slow and fast DCI, the control channel for fast DCI, and/or how the UL scheduling is expected to work has not been described.

Figure 1:
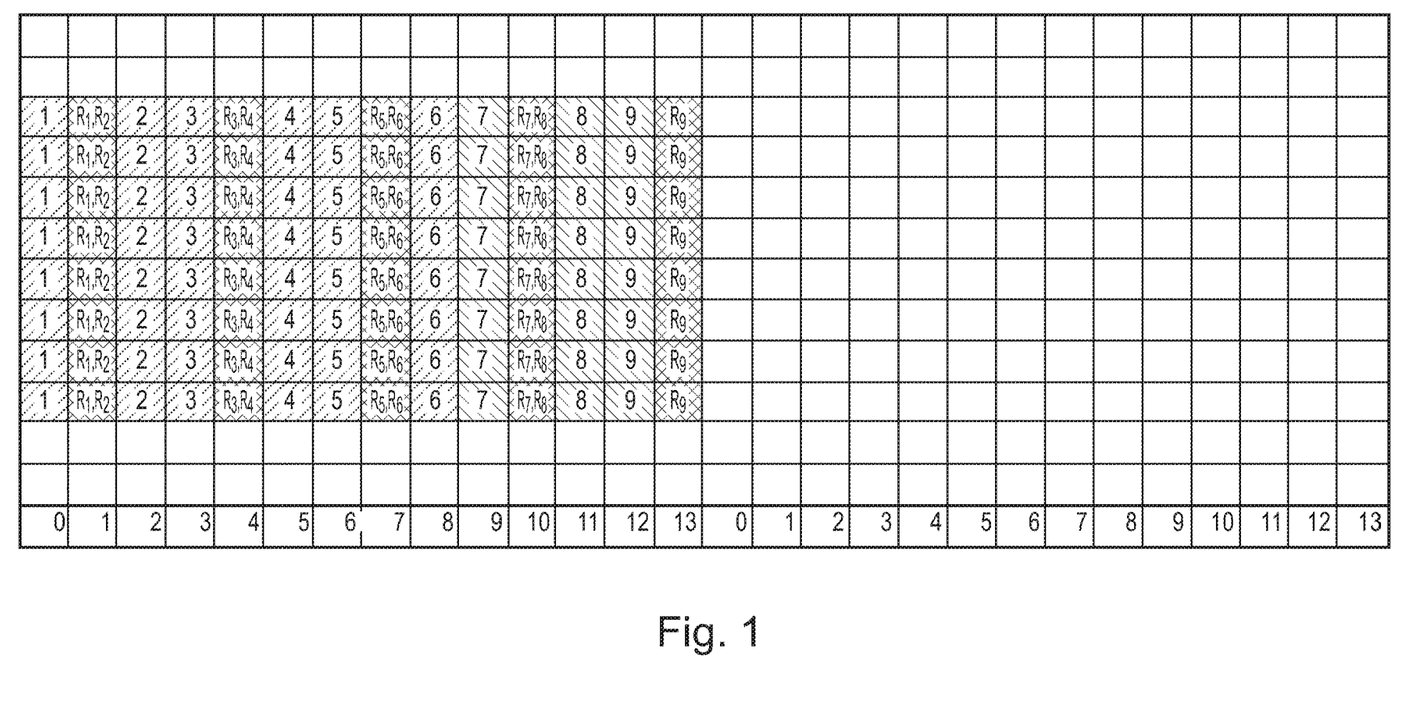
FIG. 1 illustrates an example arrangement for an uplink demodulation reference signal.

FIG. 1 illustrates an example arrangement for an uplink demodulation reference signal. FIG. 1 illustrates an arrangement that is discussed in Technical document R1-157149. As shown by FIG. 1, multiple (subsequently scheduled) UEs may share a same Demodulation Reference Signal (DMRS) location, and the DMRS position may be independent from the PUSCH data location. FIG. 1 illustrates PUSCH with a TTI of 1 SC-FDMA user data symbol, and FIG. 1 illustrates multiplexing of Reference Signals (RS) from 2 UEs in the same SC-FDMA symbol (see R1-157149).

FIG. 1 illustrates that a relative position of DMRS is associated with PUSCH changes between Transmission Time Intervals (TTIs), assuming a TTI length of 2 SC-FDMA symbols. In every second TTI, DMRS is at the end of the TTI. In the subsequent TTI, DMRS is at the beginning of the TTI, so that subsequent TTIs share the same DMRS symbol. Nevertheless, this arrangement/configuration still leads to considerable DMRS overhead (i.e., an overhead of 33%). The alternating placement of DMRS at the beginning and at the end of TTI slows down and complicates PUSCH processing at the eNB.

With certain embodiments, the first part of control information for short Transmission Time Interval (sTTI) uplink (UL) transmissions is signaled through (slow) sTTI DCI that is transmitted on legacy Physical Downlink Control Channel (PDCCH) or Enhanced PDCCH (EPDCCH) once per subframe (1 millisecond). The second part of control information for sTTI UL transmission may be signaled through mini DCIs (mDCIs) that the corresponding eNB may transmit in multiple symbols of a subframe, e.g., separately for each sTTI.

With certain embodiments, a combination of sTTI DCI and mDCI defines the PUSCH allocation, that is, UL grant. The UL grant in the sTTI DCI covers a time window of, for example, 1 ms, but the UL grant may only be a conditional UL grant. mDCIs indicate if a UE is actually allowed to use a resource in an sTTI. For example, the UE is allowed to transmit a PUSCH only if the UE receives both sTTI DCI and a related mDCI. Hence, UL grant on sTTI DCI can be seen as being conditional on receiving subsequent mDCI. For example, eNB may provide the same resource allocation with sTTI DCI for multiple UEs, and then select the UE that transmits on a particular sTTI with mDCI.

Certain embodiments of the present invention may provide new arrangements for DCI signaling and for UL DMRS signaling, which are associated with the transmission of short TTI PUSCH communication.

In accordance with the previous approaches, sTTI DCI includes much of the same information as a legacy UL grant (information relating to a Modulation and Coding Scheme (MCS), Physical Resource Blocks (PRBs), DMRS resource, and/or power control, for example). These parameters are common for a predetermined set of potential PUSCH sTTIs. The sTTI PUSCH transmission may be conditional upon later detection of subsequent mDCI(s).

sTTI DCI alone may trigger UL DMRS transmission on DMRS resources on the signaled Physical Resource Blocks (PRBs). In other words, sTTI DCI includes both conditional (PUSCH) and unconditional (DMRS) UL allocation. sTTI DCI may trigger DMRS transmissions on both UL slots of a subframe. sTTI DCI may also support dynamic selection of the DMRS block(s) within the subframe. In other words, a field or codepoint on sTTI DCI may indicate whether DMRS is transmitted on both UL slots, on only one of the slots, or not at all. DMRS may be transmitted on the first symbol of a slot, to allow for early channel estimation, and to allow for a more pipelined processing of PUSCH. mDCI may not trigger DMRS at all. PUSCH may be rate matched (i.e., mapped) around DMRS resources that are triggered by sTTI DCI. Alternatively, PUSCH may be rate matched (i.e., mapped) around DMRS resources that are semi-statically configured via RRC or system information or predetermined in specifications, while sTTI DCI indicates on which of the DMRS resources, or DMRS symbols, UE transmits the DMRS.

Additionally, sTTI DCI may provide information regarding the mDCI resource. Based on the information and prior configuration information, the UE may determine the DL sTTI resources on which the UE will try to detect mDCI. For example, the UE may be Radio-Resource-Control (RRC) configured with a set of mDCI resources, and sTTI DCI may contain only an indicator for one of the configured mDCI resources. mDCI resources may be configured into predetermined (DL) Physical Resource Block (PRB) pairs. mDCI may be demodulated based on a Cell-specific Reference Signal (CRS) or DMRS. In the event where mDCI(s) are not assigned for a certain subframe (or sTTI duration), eNB may allocate those resources for Physical Downlink Shared Channel (PDSCH).

With certain embodiments of the present invention, the UE may try to detect mDCI only on one mDCI resource per DL sTTI.

In another embodiment, the UE will try to detect mDCI on a limited set of mDCI resources per DL sTTI. In this embodiment, the same set of mDCI resources (search space) can be used to transmit mDCI for short TTI PUSCH as well as short TTI PDSCH. In this embodiment, two mDCI formats of the same size are defined: one mDCI format for short TTI PUSCH and a second mDCI format for short TTI PDSCH. An mDCI format can be identified with a flag, as in LTE DCI Format 0/1.

In an embodiment, sTTI DCI contains a temporary UE identifier to be used in mDCI reception. In this case, mDCIs for multiple UEs may be multiplexed into one mDCI message. Based on the temporary UE identifier, the UE can detect its own mDCI fields from the mDCI message. Multiplexing of multiple mDCIs into a single mDCI message may be beneficial because of an increased code block size and a reduced CRC overhead. The temporary UE identifier could be assigned to the UE semi statically by RRC signaling or MAC signaling or it could be dynamically allocated in (E)PDCCH.

Figure 2:
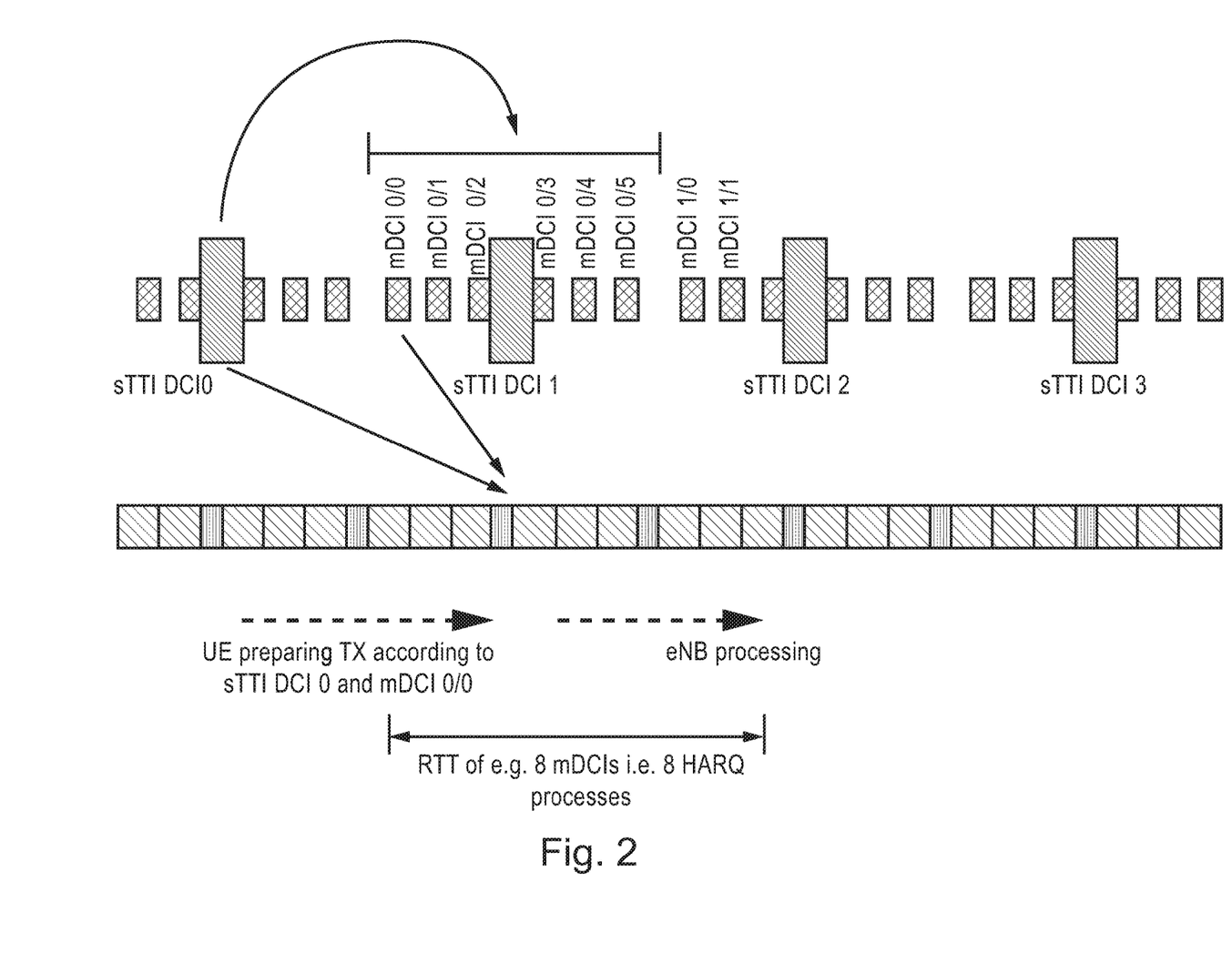
FIG. 2 illustrates the timing between signalling an uplink grant on short transmission time interval and signalling of mini downlink control information, in accordance with certain embodiments.

With regard to a UE's operation for UL grant detection, an UL grant may be signaled in 2 parts: on sTTI DCI and on mDCI. FIG. 2 illustrates, in a system with a sTTI length of two symbols, the relative timing of sTTI DCI, the related mDCIs, and the PUSCH transmission. In this example, the grant in sTTI DCI 0 is relevant with six mDCIs (mDCI 0/0 . . . mDCI 0/5), i.e., over six sTTIs.

In the absence of any detected sTTI PUSCH grants, the UE may only monitor for legacy (E)PDCCH. Once the UE has detected sTTI DCI on (E)PDCCH, the UE may start to monitor for mDCIs. The resources for potential mDCI are determined by sTTI DCI.

The same UL DCI format may contain a data field that determines whether the UL DCI format is sTTI DCI, conditionally allocating sTTI PUSCH for UE, or legacy UL DCI format triggering normal 1 ms TTI PUSCH transmission. Alternatively, the indication of UL DCI format can be performed by allocating a separate C-RNTI for sTTI use. The UE then uses two Cell Radio Network Temporary Identifiers (C-RNTIs) in the monitoring or blind decoding of legacy (Enhanced) Physical Downlink Control Channel (E)PDCCH: (1) one C-RNTI may be used with legacy UL DCI, and (2) another C-RNTI may be used with sTTI DCI. The UE may follow the DCI-PUSCH timing or scheduling delay associated with the detected UL DCI format. Currently in LTE, CRC of DCI on (E)PDCCH is masked with C-RNTI. When UE receives the (E)PDCCH and decodes the DCI, it masks the detected CRC with its C-RNTI to check whether the DCI was for it or for some other UE. When UE has two valid C-RNTIs, it simple makes two trials: first with one C-RNTI and then with the other C-RNTI. It should be noted that only one channel decoding is needed after which two masking (XOR) operations with the CRC are needed.

The arrangement of certain embodiments may minimize additional blind decoding due to sTTI operation on the UE, hence saving UE energy. The conditional sTTI PUSCH allocation as well as mDCI resource may be valid for a predetermined time window. With certain embodiments, this time window may be one subframe, but the time window may also be of a longer duration, possibly extending across multiple subframes. The time window duration may also be configurable, as indicated by Radio Resource Control (RRC) signaling, or as indicated on sTTI DCI. There may be a predefined scheduling delay between the occurrence of sTTI DCI detection to the start of the mDCI resource time window, and there may be another predefined scheduling delay from the occurrence of sTTI DCI detection to the start of the conditional sTTI PUSCH allocation window.

FIG. 2 illustrates the timing between signalling an uplink grant on short transmission time interval and signalling of mini downlink control information, in accordance with certain embodiments. A scheduling delay of 1 ms from a legacy EPDDCH to a first sTTI is shown in FIG. 2 as merely one example.

With regard to mDCI, an mDCI includes at least one of a Hybrid Automatic Repeat Request (HARQ) process number (where an asynchronous HARQ is assumed), a new data indication, and/or a Redundancy Version (RV) indicator. mDCI may also contain other information, such as, Modulation and Coding Scheme (MCS), to make the allocation even more flexible. However, including this other information may increase the size of mDCI.

With certain embodiments, the mDCI contents are small, so that mDCIs for multiple UEs may be multiplexed into one mDCI message. In this case, sTTI DCI may contain a temporary UE identifier for mDCI. Based on the temporary UE identifier, each UE can detect its own mDCI fields from the mDCI message. The temporary UE identifier could also simply be a position inside the message, if the message contains a fixed number of mDCI fields. For example, sTTI DCI indicates the resource used for the mDCI message, and indicates whether this UE's mDCI is located first, second, or third, etc., within the mDCI message.

The UE identifier indicated on sTTI DCI, as well as the mDCI message resource, may be temporary. Hence, the eNB can dynamically define UE groups that have their (potential) mDCIs multiplexed on the mDCI message. Further, the eNB can allocate multiple parallel, non-overlapping mDCI resources with reasonable overhead. Additionally, the temporary UE identifier for mDCIs can be kept quite short, hence, keeping mDCI message size reasonable.

Alternatively, each mDCI may be signaled separately. Also, in this case, the UE identifier may be included in the mDCI (for example, by scrambling Cyclic Redundancy Check (CRC) with the UE identifier by performing modulo 2 addition of UE identifier bits and predetermined CRC bits). In this case, the eNB may allocate the same mDCI resource for multiple UEs using sTTI DCI, and then decide later on which one of the UEs is scheduled on the associated sTTI PUSCH.

Additionally, CRC may be attached to the mini DCI (mDCI) message to facilitate blind detection of mDCI.

With regard to Demodulation Reference Signaling (DMRS), with certain embodiments of the invention, 2 DMRS symbols per subframe may be used. As such, DMRS overhead is not increased from existing LTE releases. DMRS for different UEs may be separated with cyclic shifts. This separation with cyclic shifts presents limits for the number of UEs that can be scheduled to transmit DMRS on the same PRB allocation. In macro cells, this limit may be on the order of 3 to 4 UEs, while in the small cells, the limit may be larger.

In time, DMRS density can be reduced in environments where small UE velocity can be assumed (e.g., in environments with small cells). In these cases, the eNB may instruct the UE to transmit DMRS only in certain slots in order to implement DMRS Time Division Multiplexing (TDM) between UE. Certain embodiments may be especially useful in cases where the UE receives sTTI DCI with the same PRB allocation for subsequent subframes.

Certain embodiments may provide an arrangement that minimizes the additional DL control channel blind decoding burden, and minimizes DL control channel overhead for sTTI operation. With certain embodiments, a longer UE battery life and a higher LTE DL efficiency may be achieved. With certain embodiments, the UL DMRS overhead is minimized. The UL DRMS overhead may remain at the same value (14%) as in earlier LTE releases, irrespective of sTTI length.

Figure 3:
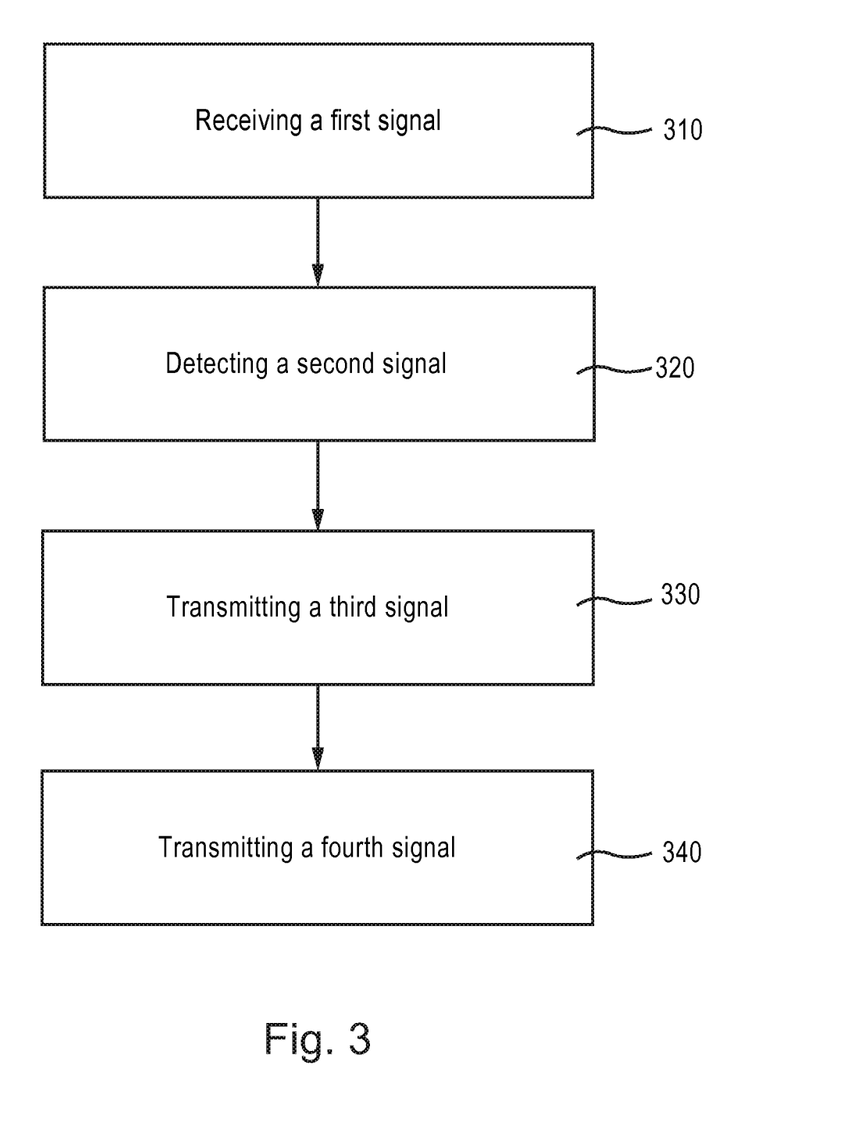
FIG. 3 illustrates a flowchart of a method in accordance with certain embodiments of the invention.

FIG. 3 illustrates a flowchart of a method in accordance with certain embodiments of the invention. The method may include, at 310, receiving, by a user equipment, a first signal. The first signal may include first configuration information, second configuration information, and third configuration information. The method may also include, at 320, detecting a second signal based on the first configuration information. The method may also include, at 330, transmitting a third signal based on the second configuration information. The method may also include, at 340, transmitting a fourth signal based on the third configuration information and the detected second signal.

Figure 4:
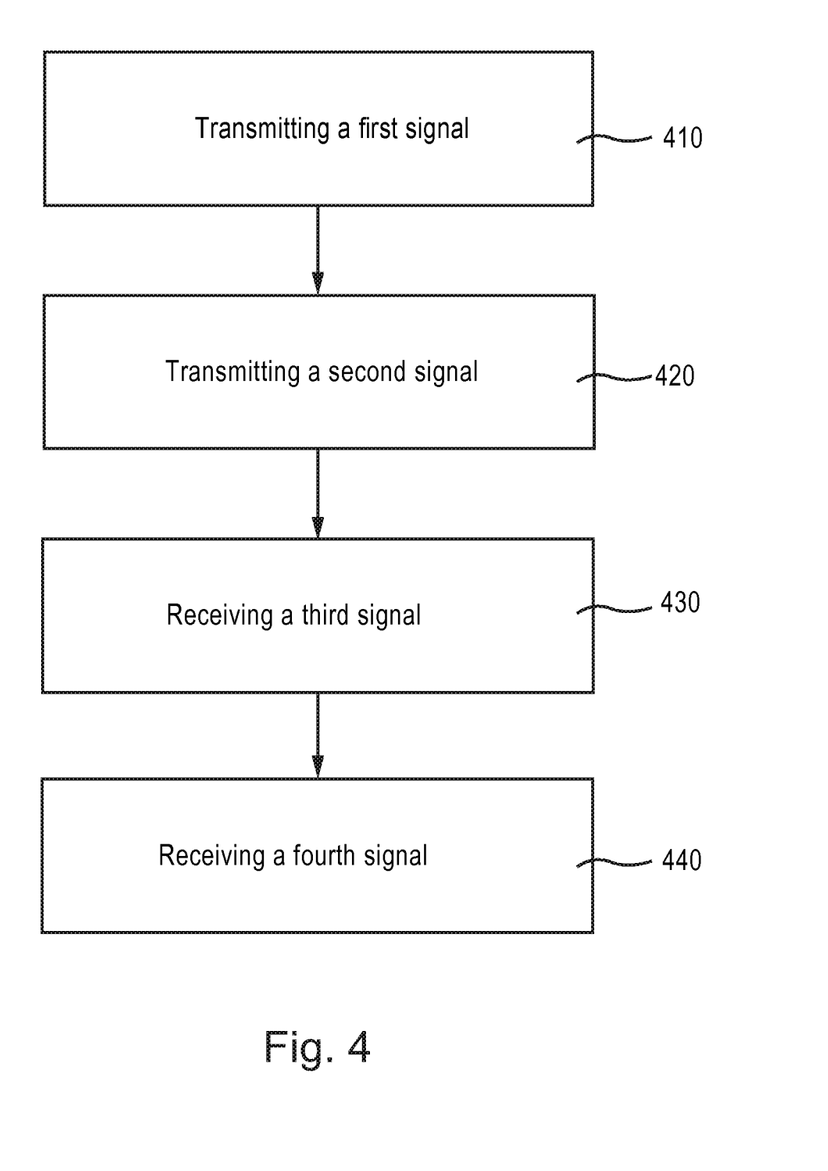
FIG. 4 illustrates a flowchart of a method in accordance with certain embodiments of the invention.

FIG. 4 illustrates a flowchart of another method in accordance with certain embodiments of the invention. The method may include, at 410, transmitting, by an enhanced Node B, a first signal to a user equipment. The first signal may include first configuration information, second configuration information, and third configuration information. The method may also include, at 420, transmitting a second signal to the user equipment in accordance to the first configuration information. The method may also include, at 430, receiving a third signal from the user equipment. The third signal is transmitted by the user equipment based on the second configuration information. The method may also include, at 440, receiving a fourth signal from the user equipment. The fourth signal is transmitted by the user equipment based on the third configuration information and the detected second signal.

Figure 5:
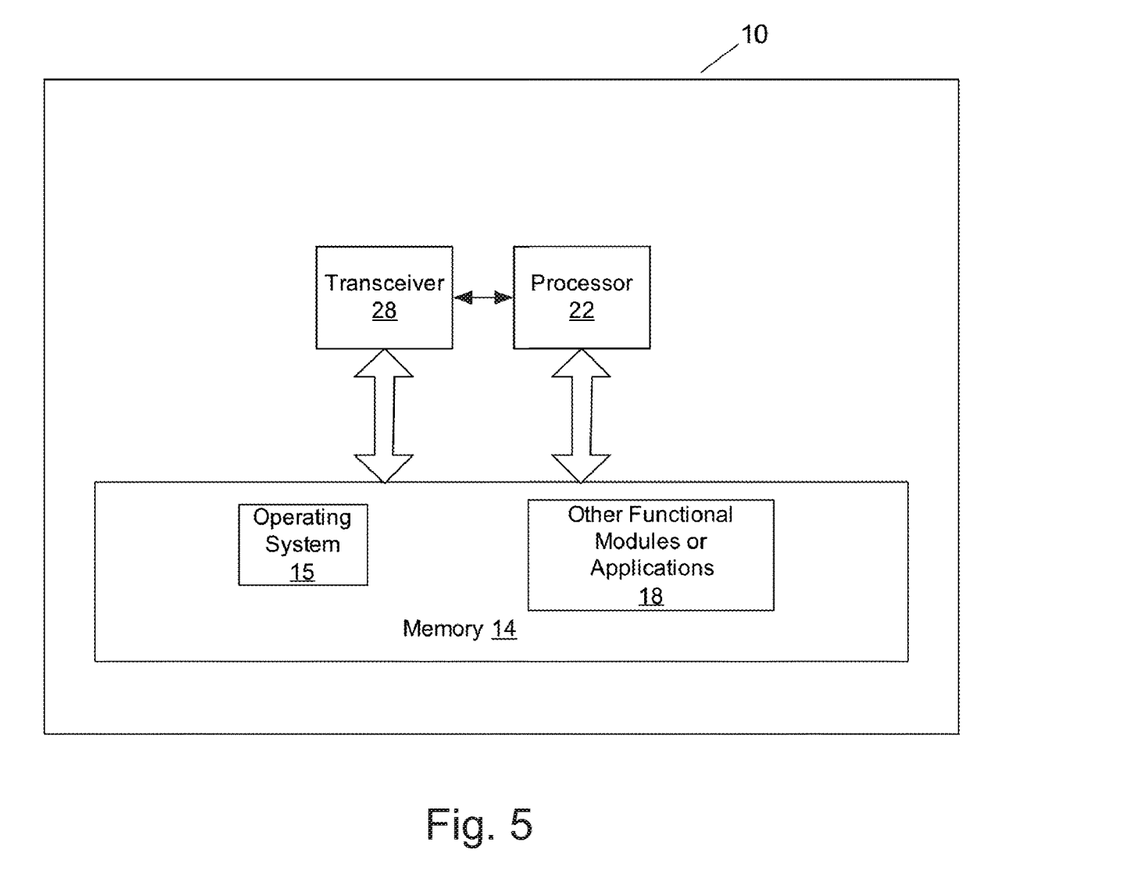
FIG. 5 illustrates an apparatus in accordance with certain embodiments of the invention.

FIG. 5 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 5, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 6:
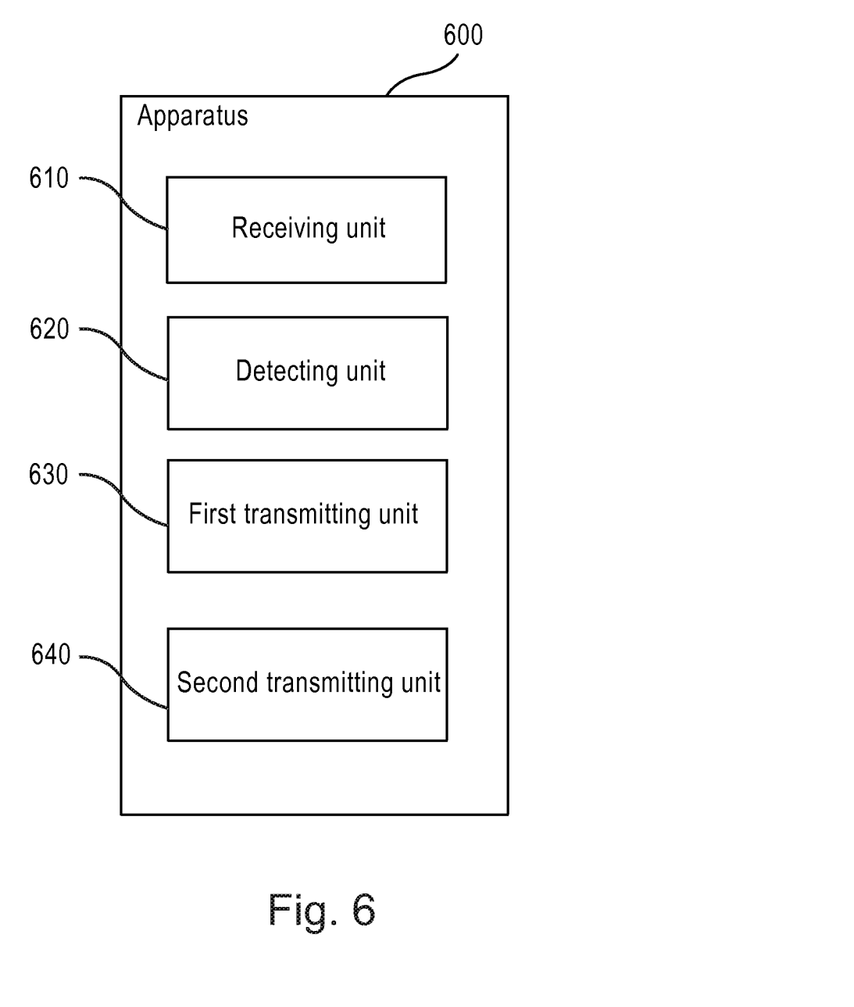
FIG. 6 illustrates an apparatus in accordance with certain embodiments of the invention.

FIG. 6 illustrates an apparatus in accordance with certain embodiments of the invention. Apparatus 600 can be a user equipment, for example. Apparatus 600 can include a receiving unit 610 that receives a first signal. The first signal may include first configuration information, second configuration information, and third configuration information. Apparatus 600 may also include a detecting unit 620 that detects a second signal based on the first configuration information. Apparatus 600 may also include a first transmitting unit 630 that transmits a third signal based on the second configuration information. Apparatus 600 may also include a second transmitting unit 640 that transmits a fourth signal based on the third configuration information and the detected second signal.

Figure 7:
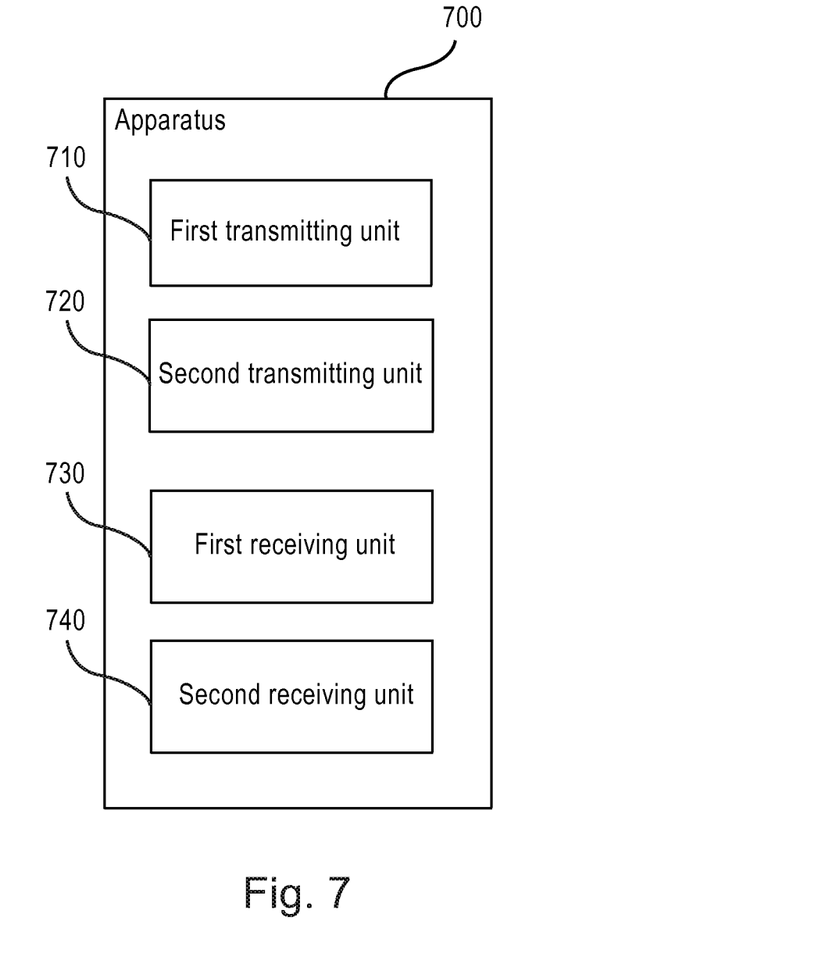
FIG. 7 illustrates an apparatus in accordance with certain embodiments of the invention.

FIG. 7 illustrates an apparatus in accordance with certain embodiments of the invention. Apparatus 700 can be a base station and/or eNB, for example. Apparatus 700 can include a first transmitting unit 710 that transmits a first signal to a user equipment. The first signal comprises first configuration information, second configuration information, and third configuration information. Apparatus 700 can also include a second transmitting unit 720 that transmits a second signal to the user equipment in accordance to the first configuration information. Apparatus 700 can also include a first receiving unit 730 that receives a third signal from the user equipment. The third signal is transmitted by the user equipment based on the second configuration information. Apparatus 700 can also include a second receiving unit 740 that receives a fourth signal from the user equipment. The fourth signal is transmitted by the user equipment based on the third configuration information and the detected second signal.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
receiving, by a user equipment, a first signal, wherein the first signal comprises first configuration information;
detecting a second signal based on the first configuration information; and
transmitting a third signal based at least partly on the detected second signal, wherein the first signal comprises a first part of downlink control information that is for short Transmission-Time-Interval uplink transmissions and is signaled through slow short Transmission-Time-Interval downlink control information, the second signal comprises a second part of downlink control information that is for the short Transmission-Time-Interval uplink transmissions and is signaled through mini downlink control information, and the third signal comprises short Transmission-Time-Interval Physical Uplink Shared Channel communication.

2. The method according to claim 1, wherein the first signal determines a search space for the user equipment to detect the second signal.

3. The method according to claim 1, further comprising: transmitting a demodulation reference signal based on second configuration information in the first signal.

4. The method according to claim 1, wherein the first signal further comprises third configuration information for transmission of the third signal and the second signal indicates that the user equipment is allowed to transmit the third signal according to the first and the second part of downlink control information.

5. The method according to claim 1, wherein the second signal comprises at least a Hybrid Automatic Repeat Request process number.

6. The method according to claim 1, wherein the first signal is received on Physical Downlink Control Channel or Enhanced PDCCH, and the second signal is detected on a control channel associated with shortened Transmission Time Interval.

7. An apparatus, comprising:
at least one processor; and
at least one memory including computer program code, the at least one memory and the computer program code configured, with the at least one processor, to cause the apparatus at least to
receive a first signal, wherein the first signal comprises first configuration information;
detect a second signal based on the first configuration information; and
transmit a third signal at least partly based on the detected second signal, wherein the first signal comprises a first part of downlink control information that is for short Transmission-Time-Interval uplink transmissions and is signaled through slow short Transmission-Time-Interval downlink control information, the second signal comprises a second part of downlink control information that is for the short Transmission-Time-Interval uplink transmissions and is signaled through mini downlink control information, and the third signal comprises short Transmission-Time-Interval Physical Uplink Shared Channel communication.

8. The apparatus according to claim 7, wherein the first signal determines a search space for the apparatus to detect the second signal.

9. The apparatus according to claim 7, wherein the at least one memory and the computer program code are configured to, with the at least one processor, cause the apparatus at least to transmit a demodulation reference signal based on second configuration information in the first signal.

10. The apparatus according to claim 7, wherein the first signal further comprises third configuration information for transmission of the third signal and the second signal indicates that the apparatus is allowed to transmit the third signal according to the first and the second part of downlink control information.

11. The apparatus according to claim 7, wherein the second signal comprises at least a Hybrid Automatic Repeat Request process number.

12. The apparatus according to claim 7, wherein the first signal is received on Physical Downlink Control Channel or Enhanced PDCCH, and the second signal is detected on a control channel associated with shortened Transmission Time Interval.

13. A method, comprising:
transmitting, by an enhanced Node B, a first signal to a user equipment, wherein the first signal comprises first configuration information;
transmitting a second signal to the user equipment in accordance to the first configuration information; and
receiving a third signal from the user equipment, wherein the received third signal is based at least partly on the transmitted second signal, wherein the first signal comprises a first part of downlink control information that is for short Transmission-Time-Interval uplink transmissions and is signaled through slow short Transmission-Time-Interval downlink control information, the second signal comprises a second part of downlink control information that is for the short Transmission-Time-Interval uplink transmissions and is signaled through mini downlink control information, and the third signal comprises short Transmission-Time-Interval Physical Uplink Shared Channel communication.

14. The method according to claim 13, wherein the second signal is transmitted to the user equipment on a search space determined by the first signal.

15. An apparatus, comprising:
at least one processor; and
at least one memory including computer program code, the at least one memory and the computer program code configured, with the at least one processor, to cause the apparatus at least to
transmit a first signal to a user equipment, wherein the first signal comprises first configuration information;
transmit a second signal to the user equipment in accordance to the first configuration information; and
receive a third signal from the user equipment, wherein the received third signal is based at least partly on the transmitted second signal, wherein the first signal comprises a first part of downlink control information that is for short Transmission-Time-Interval uplink transmissions and is signaled through slow short Transmission-Time-Interval downlink control information, the second signal comprises a second part of downlink control information that is for the short Transmission-Time-Interval uplink transmissions and is signaled through mini downlink control information, and the third signal comprises short Transmission-Time-Interval Physical Uplink Shared Channel communication.

16. The apparatus according to claim 15, wherein the second signal is transmitted to the user equipment on a search space determined by the first signal.

17. The apparatus according to claim 15, wherein the at least one memory and the computer program code are configured to, with the at least one processor, cause the apparatus at least to receive a demodulation reference signal from the user equipment, wherein the first signal further comprises second configuration information, and the received demodulation reference signal is based on the second configuration information.

18. The apparatus according to claim 15, wherein the second signal indicates that the user equipment is allowed to transmit the third signal according to the first and the second part of downlink control information.

19. The apparatus according to claim 15, wherein the second signal comprises at least a Hybrid Automatic Repeat Request process number.

20. The apparatus according to claim 15, wherein the first signal is transmitted on Physical Downlink Control Channel or Enhanced PDCCH, the second signal is transmitted on a control channel associated with shortened Transmission Time Interval.

* * * * *